United States Patent
Carroll et al.

(10) Patent No.: US 11,852,613 B2
(45) Date of Patent: Dec. 26, 2023

(54) TESTING MACHINE WITH ACTUATOR AND COLUMN BRACE

(71) Applicant: MTS Systems Corporation, Eden Prairie, MN (US)

(72) Inventors: Paul Carroll, Eden Prairie, MN (US); Dmitrii Pokhil, Arden Hills, MN (US); Byron Saari, Minneapolis, MN (US)

(73) Assignee: MTS Systems Corporation, Eden Prairie, MN (US)

( * ) Notice: Subject to any disclaimer, the term of this patent is extended or adjusted under 35 U.S.C. 154(b) by 337 days.

(21) Appl. No.: 17/148,267

(22) Filed: Jan. 13, 2021

(65) Prior Publication Data

US 2021/0215587 A1 Jul. 15, 2021

Related U.S. Application Data

(60) Provisional application No. 62/961,178, filed on Jan. 14, 2020.

(51) Int. Cl.
*G01N 3/08* (2006.01)
*G01N 3/02* (2006.01)
*G01N 3/32* (2006.01)

(52) U.S. Cl.
CPC .................. *G01N 3/08* (2013.01); *G01N 3/02* (2013.01); *G01N 2203/0016* (2013.01); *G01N 2203/0042* (2013.01)

(58) Field of Classification Search
CPC ........ G01M 1/22; G01M 13/025; G01M 1/00; G01M 7/027; G01M 15/01; G01N 1/04;
(Continued)

(56) References Cited

U.S. PATENT DOCUMENTS

| 3,102,421 A | 9/1963 | Cosner et al. |
| 3,142,980 A | 8/1964 | Andersen |

(Continued)

FOREIGN PATENT DOCUMENTS

| CN | 202710413 U | 1/2013 |
| CN | 109839306 A | 6/2019 |

(Continued)

OTHER PUBLICATIONS

"Test Systems for Automobiles: Engine Test Systems", 2014, pp. 1-2, retrieved from tp://www.saginomiya.co.jp/sikenki/carengin.html.

(Continued)

*Primary Examiner* — Brandi N Hopkins
(74) *Attorney, Agent, or Firm* — Steven M. Koehler; Westman, Champlin & Koehler, P.A.

(57) ABSTRACT

A testing machine includes a base, at least a pair of columns joined to the base and a crosshead joined to the columns at a location spaced apart from the base. At least a pair of specimen holders are provided. A first specimen holder is supported by the crosshead and faces the base, and a second specimen holder is supported by the base, the base being that portion joined to each of the columns closest to the crosshead. An actuator connected in series between one of the specimen holders and the corresponding base or crosshead. A brace connected to each of the columns and spanning between the columns, the brace being connected to each of the columns at a location along a length thereof between the base and the crosshead.

21 Claims, 8 Drawing Sheets

(58) Field of Classification Search
CPC .. G01N 3/12; G01N 1/42; G01N 3/22; G01N 3/28; G01N 3/30; G01N 3/34; G01N 3/066; G01L 1/2218; E04H 9/023; H02K 41/031; G01B 5/30; G01P 21/00
See application file for complete search history.

(56) References Cited

U.S. PATENT DOCUMENTS

| | | | |
|---|---|---|---|
| 3,158,048 | A | 11/1964 | Bollar |
| 3,297,284 | A | 1/1967 | Pellerin |
| 3,442,120 | A | 5/1969 | Russenberger et al. |
| 3,589,278 | A | 6/1971 | Brauer et al. |
| 3,597,960 | A | 8/1971 | Otera et al. |
| 4,445,381 | A | 5/1984 | Russenberger |
| 4,478,086 | A | 10/1984 | Gram |
| 4,901,580 | A | 2/1990 | Potts |
| 5,412,995 | A | 5/1995 | Smith |
| 5,677,494 | A | 10/1997 | Keener et al. |
| 5,948,994 | A * | 9/1999 | Jen .................... G01N 3/08 73/796 |
| 6,023,980 | A | 2/2000 | Owen et al. |
| 6,427,988 | B1 | 8/2002 | Li |
| 6,601,456 | B1 | 8/2003 | Davidson et al. |
| 6,931,941 | B2 | 3/2005 | Shelby |
| 6,938,494 | B2 | 9/2005 | Takada et al. |
| 7,404,334 | B2 | 7/2008 | Saari et al. |
| 2004/0139804 | A1 | 7/2004 | Takada et al. |
| 2005/0050963 | A1 | 3/2005 | Shelby |
| 2008/0210014 | A1* | 9/2008 | Merendino .............. G01N 3/08 73/818 |
| 2023/0025483 | A1* | 1/2023 | Numata ................ G01M 5/005 |

FOREIGN PATENT DOCUMENTS

| | | |
|---|---|---|
| DE | 3102778 A1 | 12/1981 |
| FR | 2697912 A1 | 5/1994 |
| GB | 1442048 A | 7/1976 |
| JP | S57048632 A | 3/1982 |
| WO | 9837400 A1 | 8/1998 |
| WO | 2019045646 A1 | 3/2019 |

OTHER PUBLICATIONS

Hoffelner, W., "Fatigue Crack Growth at 20 KHz—A New Technique", Journal of Physics E: Scientific Instruments, Jun. 1980, pp. 617-619, vol. 13, No. 6.

International Search Report and Written Opinion for International application No. PCT/US2021/013248, dated Apr. 14, 2021.

* cited by examiner

TESTING MACHINE WITH ACTUATOR AND COLUMN BRACE

CROSS-REFERENCE TO RELATED APPLICATIONS

The present application is based on and claims the benefit of U.S. provisional patent application Ser. No. 62/961,178, filed Jan. 14, 2020, the content of which is hereby incorporated by reference in its entirety.

BACKGROUND

The discussion below is merely provided for general background information and is not intended to be used as an aid in determining the scope of the claimed subject matter.

The physical testing of materials and/or components by taking a test specimen and applying tension and/or compressive loads and/or displacements using an actuator is well known. Commonly, the tension and compression loads are applied to the test specimen in an alternating matter at a selected frequency, or through a range of frequencies at constant displacement or amplitude. In harmonic motion, such as present in this form of testing, the acceleration of moving components of the actuator, the specimen grips, etc. are proportional to the amount of displacement multiplied by the square of the frequency. Therefore, even if the amplitude is small (e.g. 0.06 mm), the acceleration can be very large at higher frequencies (e.g. 700-1000 Hertz.)

Consequently, the force, which proportional to the mass of the moving components times the acceleration, is also increasing by the square of the frequency, as the frequency increases. Moreover, this force must be reacted by the structure of the test system, which will cause excitation of modes in the test system.

A common test machine includes a base with upstanding columns that support a crosshead over the base. A first specimen grip is coupled to the crosshead through a force transducer, while a second specimen grip is coupled to the base using an actuator; however the location of the actuator and force transducer can be reversed.

Due to the large dynamic forces, vibrations can be present during operation. One mode of vibration that is proving to be detrimental to testing is a "box mode" excited in the box-like construction of the crosshead, base and columns. This mode is detrimental because these mode cause the force transducer (and/or displacement sensor) to move up and down, which induces error in its corresponding output signal(s).

SUMMARY

This Summary is provided to introduce some concepts in a simplified form that are further described below in the Detailed Description. This Summary is not intended to identify key features, essential features or all features of the invention. In addition, the description herein provided and the claimed subject matter should not be interpreted as being directed to addressing any of the short-comings discussed in the Background.

A testing machine includes a base, at least a pair of columns joined to the base and a crosshead joined to the columns at a location spaced apart from the base. At least a pair of specimen holders is provided. A first specimen holder is supported by the crosshead and faces the base, and a second specimen holder is supported by the base, the base being that portion joined to each of the columns closest to the crosshead. An actuator connected in series between one of the specimen holders and the corresponding base or crosshead. A brace connected to each of the columns and spanning between the columns, the brace being connected to each of the columns at a location along a length thereof between the base and the crosshead.

Embodiments can include one or more of the following features. The brace can be connected to each of the columns at various locations. In a first embodiment, the brace is connected to each of the columns between ends of the specimen holders remote from each other, while in another embodiment it may be preferable to connect the to each of the columns between ends of the specimen holders closest to each other.

Some preferred ranges include locating the brace being connected to each of the columns at a location in a range of about 25% to 75% of a distance between the ends of the specimen holders closest to each other. In a further embodiment, the brace is connected to each of the columns at a location in a range of about 40% to 60% of a distance between the ends of the specimen holders closest to each other. The brace can also be connected to each of the columns at about 50% of a distance between the ends of the specimen holders closest to each other.

Each column includes an axis and the brace can include portions extending along planes between the columns that are parallel to a plane having the axes of both columns. The portions at each end of the brace are joined to opposite sides of an outer surface of each respective column along a bisecting plane for each column, the bisecting planes being normal to the plane extending between the columns. The brace can include an aperture through which an axis between the specimen holders can extend. If desired, the brace can include a removable portion defining a portion of the aperture, allowing easy insertion and removal of the test specimen without removing or moving the brace along the columns.

Typically, the test machine includes at least a pair of columns but also may include additional columns such as four columns. With more than two columns, a second brace can be connected between two different columns than the first brace, the second brace being connected to each of the respective columns at a location along a length thereof at least between ends of the specimen holders remote from each other. Depending on the number of columns, the testing machine may include a third brace and a fourth brace, the brace, the second brace, the third brace and the fourth brace each connecting adjacent columns about a perimeter encircling an axis extending between the specimen holders.

The columns can extend through base. Ends of the columns on a side of the base remote from the crosshead typically are joined together in such an embodiment. Likewise, the columns can extend through the crosshead, where ends of the columns on a side of the crosshead remote from the base are joined together.

The testing machine also includes a base; at least a pair of columns joined to the base; a crosshead joined to the columns at a location spaced apart from the base; at least a pair of specimen holders, where a first specimen holder is supported by the crosshead and faces the base, and a second specimen holder is supported by the base, the base being that portion joined to each of the columns closest to the crosshead; an actuator connected in series between one of the specimen holders and the corresponding base or crosshead;

A testing machine includes a base, at least a pair of columns joined to the base and a crosshead joined to the columns at a location spaced apart from the base. At least a pair of specimen holders is provided. A first specimen holder is supported by the crosshead and faces the base, and a second specimen holder is supported by the base, the base being that portion joined to each of the columns closest to the crosshead. An actuator connected in series between one of the specimen holders and the corresponding base or crosshead. A brace assembly is connected to each of the columns at a location along a length of each column between the base and the crosshead, the brace assembly spanning between the columns so as to connect the columns together or to the base or the crosshead. In a first embodiment, the brace connected to and span between the columns at a location spaced apart from the base and the crosshead. In addition or in the alternative, the brace assembly may include a gusset connected to each column, where a first end of the gusset is connected to the column and a second end is connected to the base or the crosshead.

DETAILED DESCRIPTION

Figure 1:
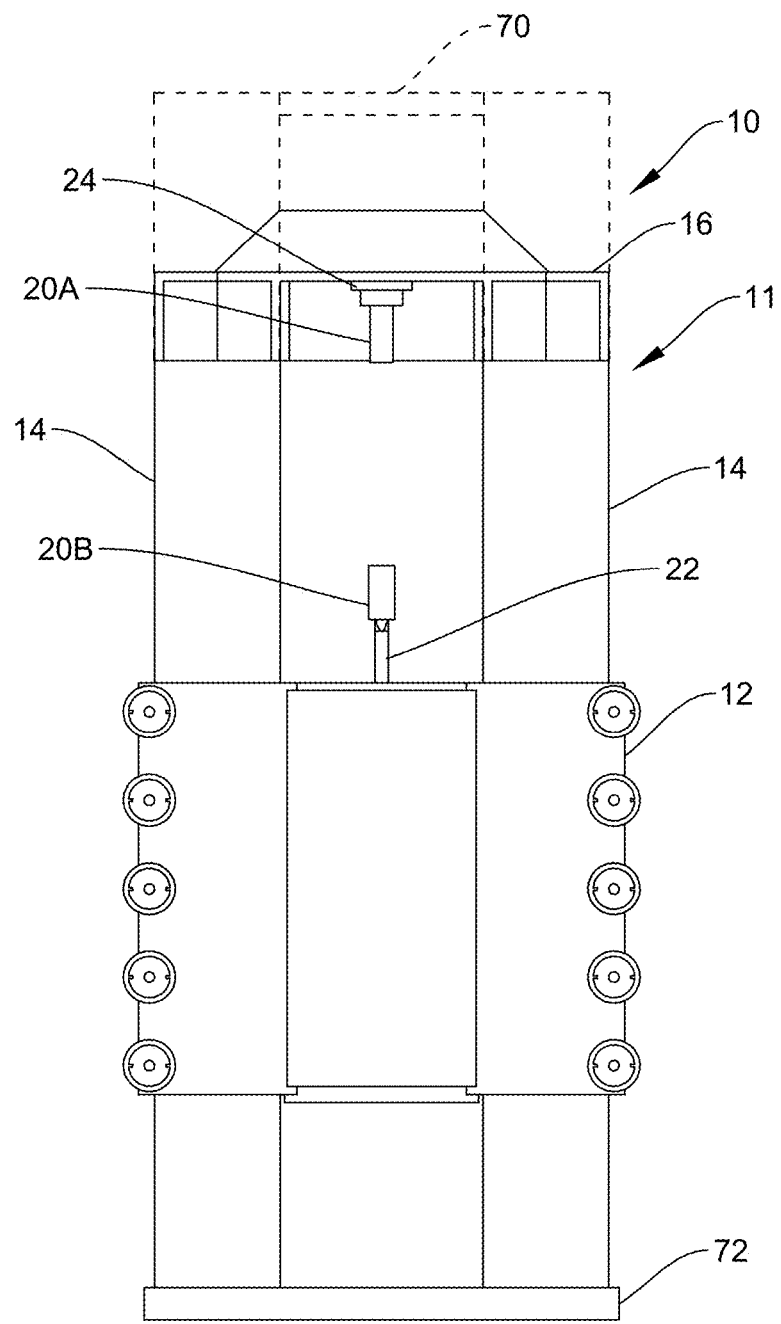
FIG. 1 is a side elevational view of a testing machine.

A schematic view of a testing machine 10 for applying forces or motions to a test specimen (not illustrated) is illustrated in FIG. 1. The testing machine includes a frame 11 having a base 12, a pair of columns 14 that extend upwardly from the base 12, and a crosshead 16 joined two of the columns 14 at a location spaced apart from the base 12. At least a pair of specimen holders, 20A, 20B, are provided. A first specimen holder 20A is supported by the crosshead 16 and extends toward the base 12. A second specimen holder 20B is supported by the base 12 and extends toward the crosshead 16. It should be noted, the base 12 is that portion of the testing machine 10 that is joined to each of the columns 14 closest to the crosshead 16.

An actuator 22 is connected in series between one of these specimen holders 20A, 20B and the corresponding base 12 or crosshead 16. In the embodiment illustrated, the first specimen holder 20A is joined to a force transducer 24 that is supported by the crosshead 16, while the second specimen holder 20B is coupled to the actuator 22 in the base 12. It should be noted in another embodiment, the actuator 22 is located in the crosshead 16 whereas the force transducer 24 would then be joined to the base 12.

Figure 3:
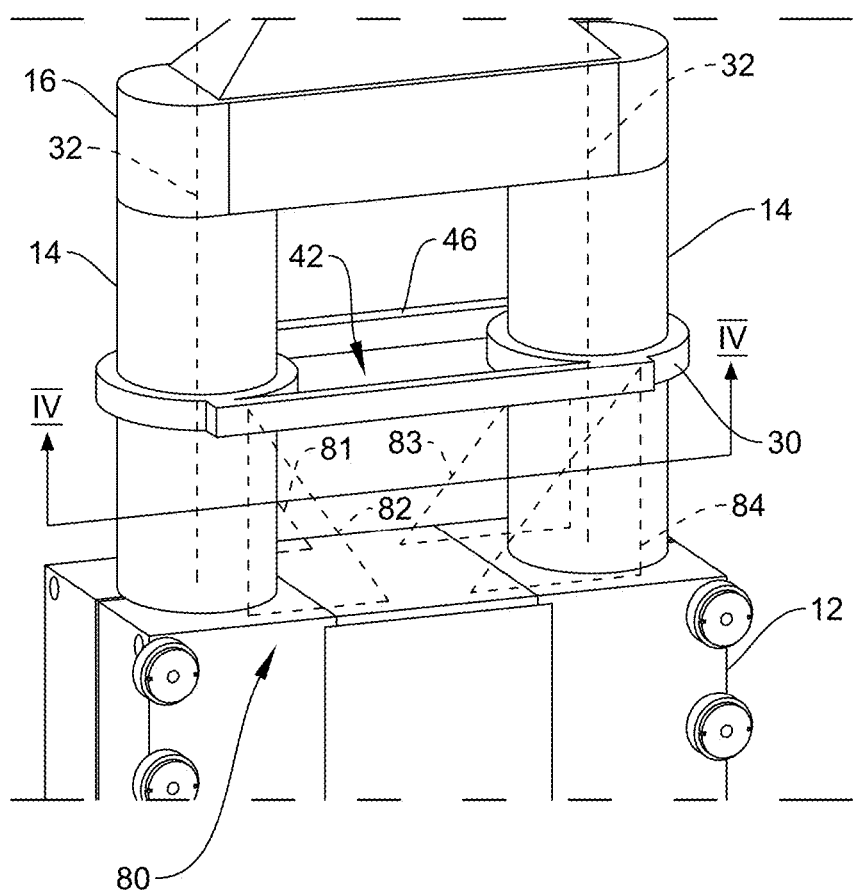
FIG. 3 is a perspective view of a portion of the testing machine.
Figure 4:
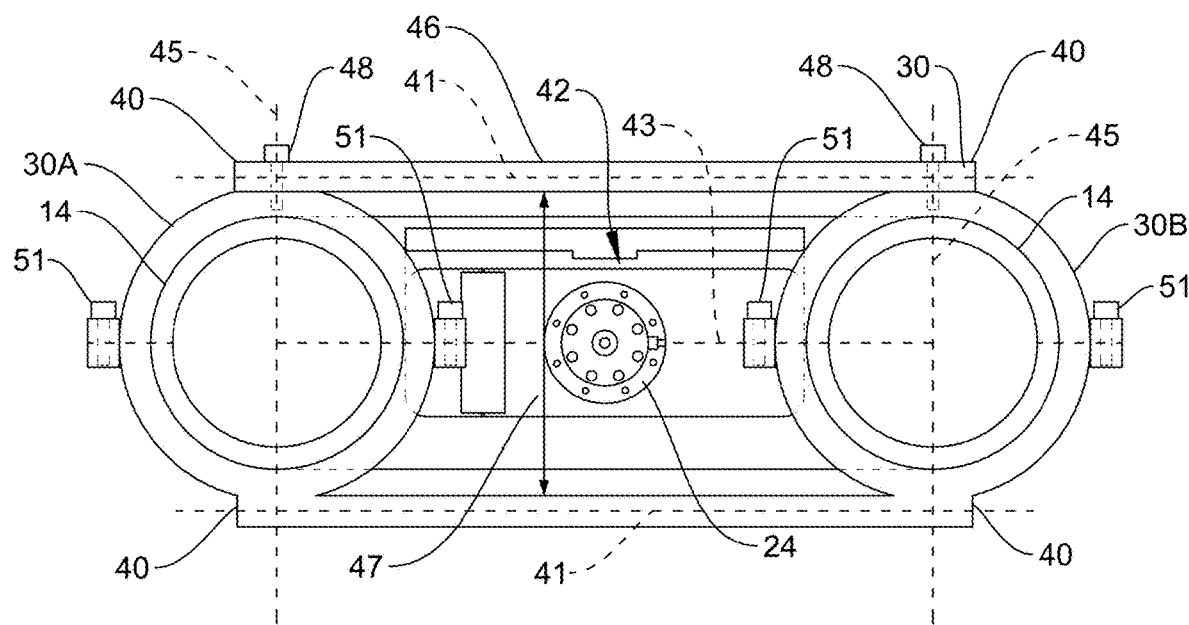
FIG. 4 is a sectional view of the testing machine taking along line IV-IV in FIG. 3.
Figure 5:
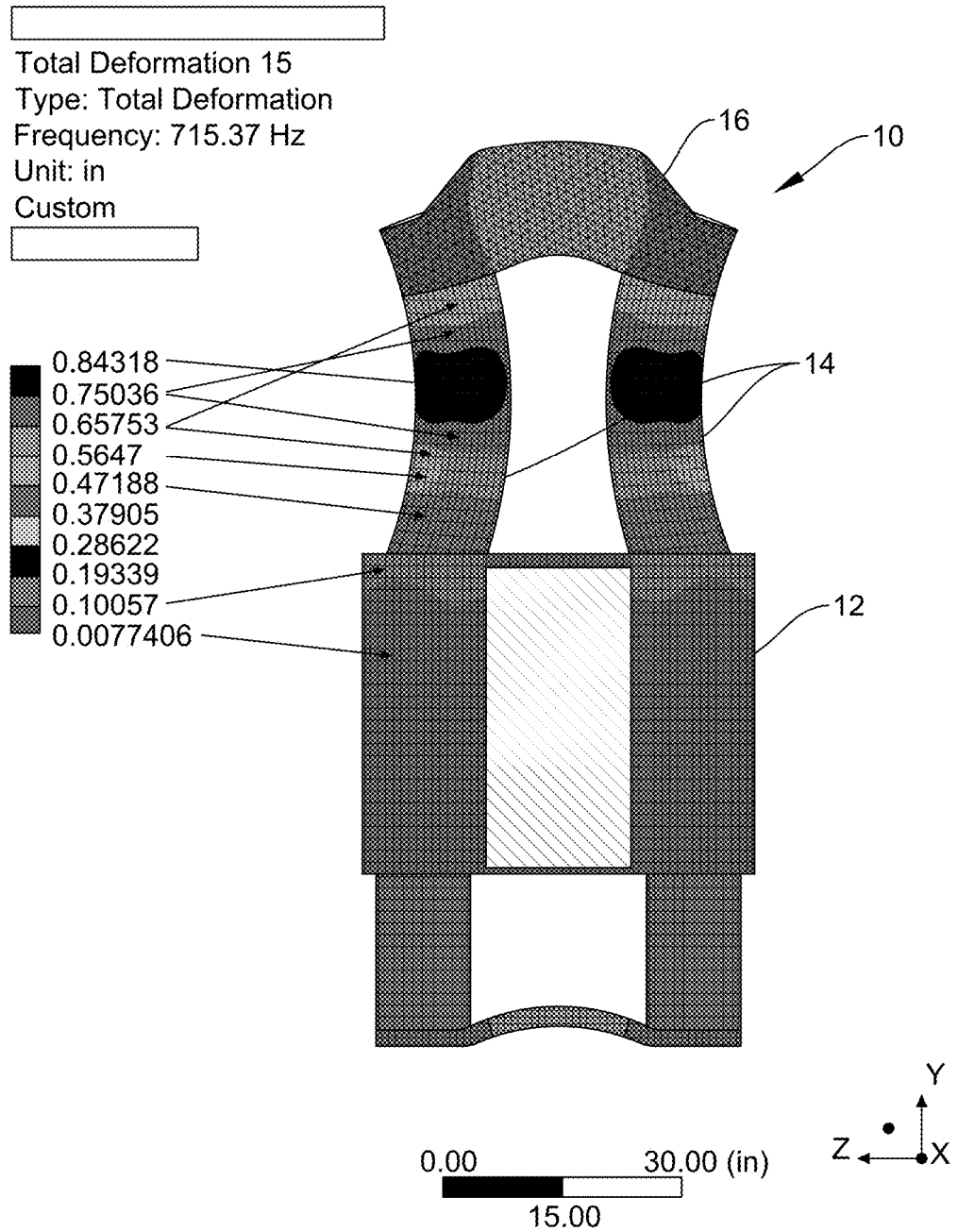
FIG. 5 is a pictorial illustration of deformation in the testing machine at a selected frequency without a column brace.
Figure 6:
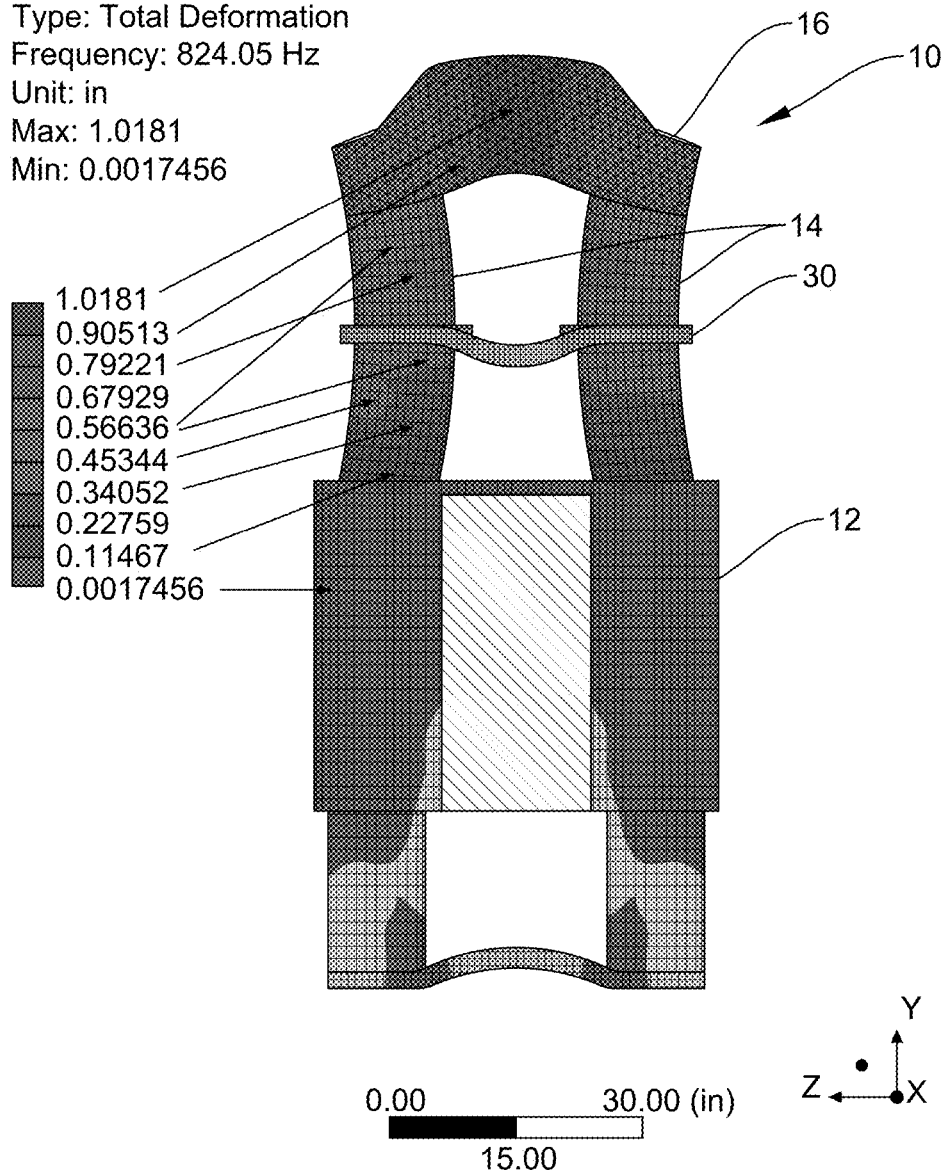
FIG. 6 is a pictorial illustration of deformation in the testing machine at a selected frequency with a column brace.

Referring to FIGS. 3 and 4, a brace assembly herein illustrated as a brace 30 is connected to each of the columns 14 and spans between the columns 14, the brace 30 is connected to each of the columns 14 at a location along a length thereof between the base 12 and the crosshead 16. The testing machine 10 has several resonant modes of vibration. One mode of vibration that is significant is commonly referred to as "the box mode". With the addition of the brace 30 coupling the columns 14 together, such as roughly at the mid-span of the columns 14 between the base 12 and the crosshead 16, a significant increase in the box mode frequency is obtained relative to a testing machine without the brace 30. FIGS. 5 and 6 pictorially illustrate in an exaggerated form the testing machine 10 with and without the brace 30, respectively. In FIG. 5, the testing machine 10 without the brace 30 experiences significant deformation at roughly the mid-span of the columns 14 with decreasing deformation extending downwardly towards the base 12 and upwardly towards the crosshead 16.

Figure 7:
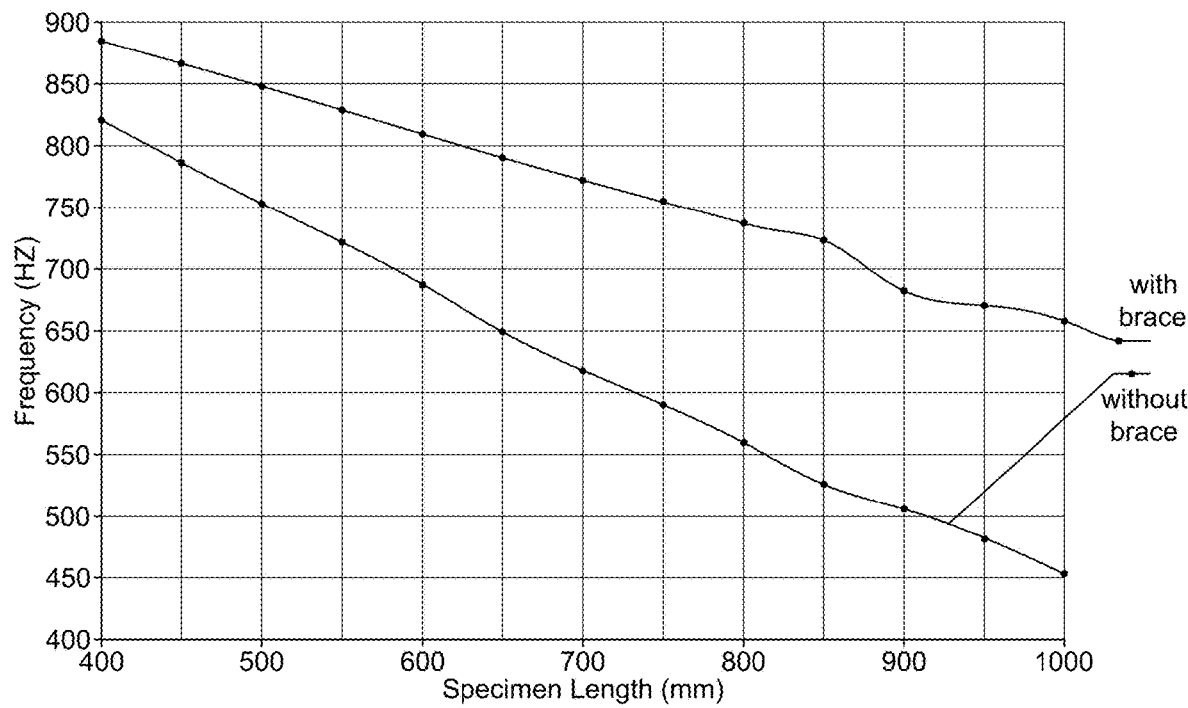
FIG. 7 illustrates box mode resonant frequencies for specimens of different lengths.

In FIG. 6, the brace 30 extends between the columns 14. The deformation of the columns 14 at the mid-span has been reduced significantly, although additional deformation can be present in the crosshead 16. More importantly, the box mode resonant frequency has increased from about 715 Hertz without the brace 30 and to about 824 Hertz with the brace 30. FIG. 7 illustrates box mode resonant frequencies for specimens of different lengths.

Although illustrated in FIGS. 3 and 6 where the brace 30 is disposed at about the mid-span of the columns 14, other locations along the columns 14 can provide benefit. Generally, the brace 30 is connected to each of the columns 14 at a location along a length thereof between the ends of the specimen holders 20A, 20B remote from each other. In a further embodiment, the brace 30 is connected to each of the columns 14 between ends of the specimen holders 20A, 20B closest to each other. In a further embodiment, the brace 30 is connected to each of the columns 14 at a location at a range of about 25% to about 75% of a distance between the ends of the specimen holders 20A, 20B closest to each other. In yet another embodiment, the brace 30 is connected to each of the columns at a location and a range of about 40% to about 60% of a distance between the ends of the specimen holders 20A, 20B closest to each other. The brace 30 can also be connected to each of the columns 14 at about 50% of a distance between the ends of the specimen holders 20A, 20B closest to each other.

Each column 14 includes an axis 32 and the brace 30 includes portions 40 extending along planes 41 between the columns 14 that are parallel to a plane 43 having the axes 32 of both columns 14. In one embodiment, the portions 40 at each end of the brace 30 are joined to opposite sides of an outer surface of each respective column 14 at a bisecting plane 45 for each column 14, the bisecting planes 45 being normal to the plane 43 extending between the columns 14. It is believed locating or joining the brace 30 at the points on the outer surface of the columns 14 coincident with the bisecting planes 45 provides the most stiffness to the columns 14. Typically, the brace 30 is mounted to the columns 14 so as to provide structural elements, such as portions 40, that extend in a plane that is perpendicular to axes of the columns 14.

Figure 2:
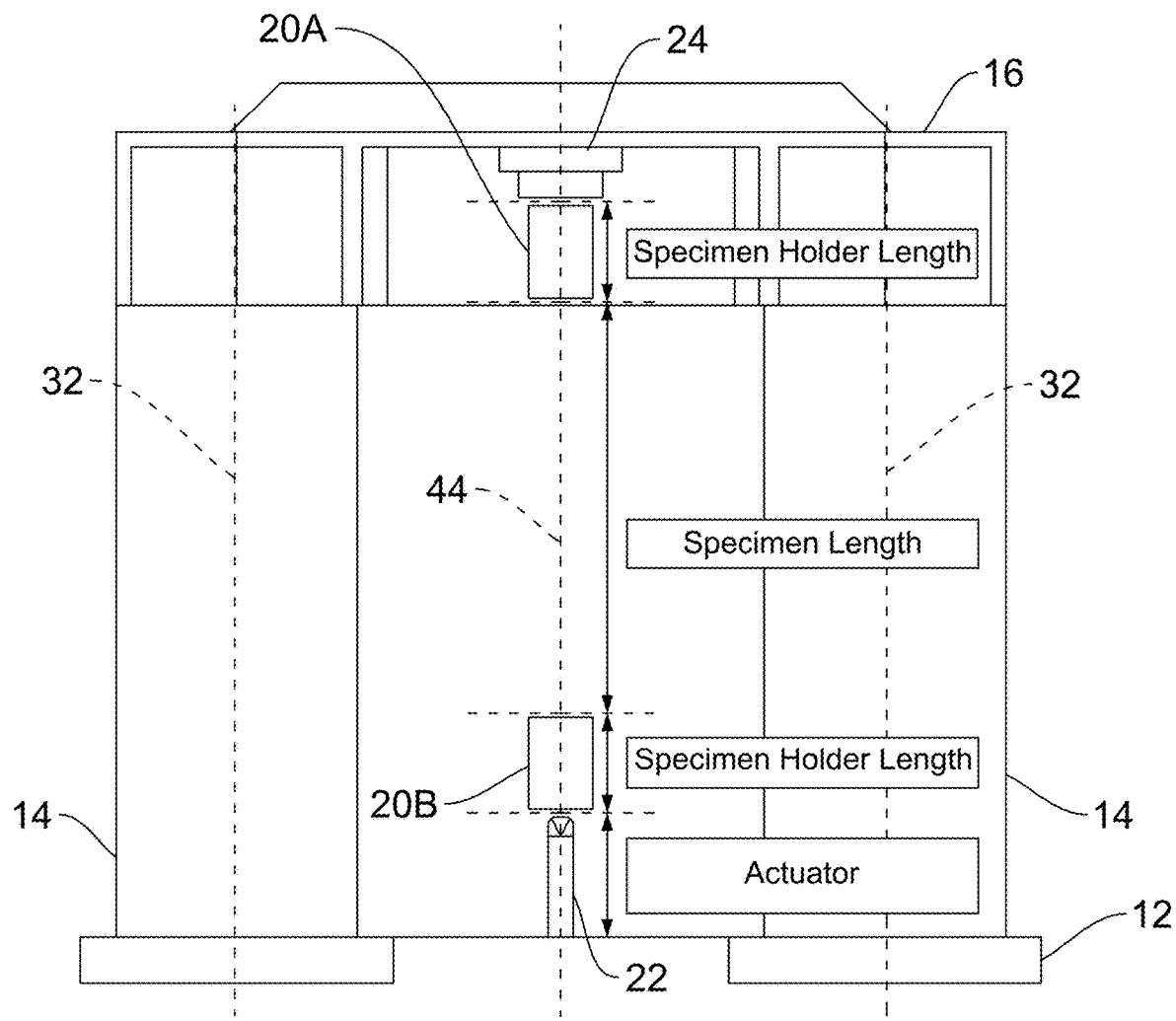
FIG. 2 is an enlarged view of a portion of the testing machine.

Referring to FIG. 4, the brace 30 can include an aperture 42 through which an axis 44 (FIG. 2) between the specimen holders 20A, 20B extends. The aperture 42 thus allows a test specimen to be joined to the specimen holders 20A, 20B along the axis 44 without being in contact with portions of the brace 30. The aperture 42 can be of size so as to allow an end of the test specimen to extend through the aperture 42 during loading where then the ends of the test specimen can then be attached to each other specimen holders 20A, 20B. It should be noted in the exemplary embodiment, columns 14 have a relatively large diameter, which may be wider than the test specimen to be tested; however, the configuration of brace 30 illustrated should not be limiting in that the brace 30 can have an aperture that is about the same size or larger than the diameter of the columns 14, in which case, portions of the brace 30 extending between the columns 14 can bow out in one or both of the directions indicated by double arrow 47 if necessary to provide the larger aperture.

In a further embodiment, a portion 46 of the brace 30 that defines part of the perimeter of the aperture 42 is removable so as to allow the test specimen to be inserted into the aperture 42 or removed therefrom. The portion 46 is then reattached once the test specimen has been mounted to the specimen holders 20A, 20B. The removable portion 46 can be joined to other portions of the brace 30 using suitable fasteners 48 such as threaded bolts or the like. In another embodiment, the portion 46 may be hinged at one end such that only one fastener is needed to secure the portion 46 to the other portions of the brace 30.

Ends 30A, 30B of the brace are secured to the columns 14 such as upon the outer surfaces thereof. In one embodiment, each of the ends 30A, 30B comprises a clamp that is clamped upon the outer surface of the columns 14. For instance, the clamp at each end 30A, 30B can comprise a split collar with one or more suitable fasteners 51 such as a threaded bolt or the like that can constrict or expand an inner diameter (or also mount the separate portions together) of the brace 30 so as to clamp upon the outer surface of the column 14.

Figure 8:
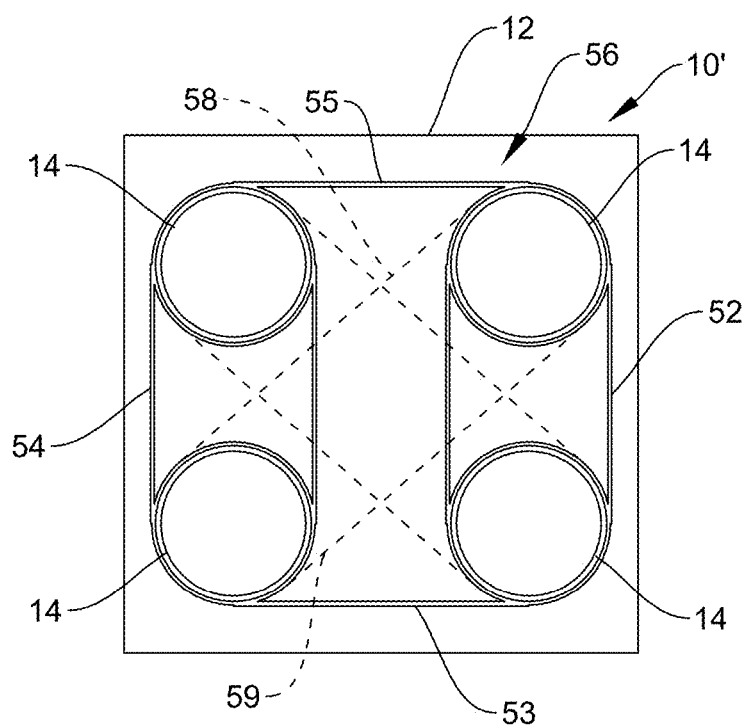
FIG. 8 is a schematic diagram illustrating column braces.

It should be noted that the brace 30 herein disclosed is not limited to testing machines only having a pair of columns, but rather, can be used with other multi-column testing machines. FIG. 8 is a top schematic sectional view of a testing machine 10' having four columns 14. In such a testing machine, multiple braces 52, 53, 54 and 55 (similar to brace 30) are used between adjacent columns 14 so as to form a structure 56 with individual braces 52-55 spanning between adjacent columns. In addition, or in the alternative, braces 58, 59 can extend between non-adjacent columns 14, such as diagonally when four columns 14 are arranged in a square or a rectangle. The braces 58, 59 that extend diagonally hence would potentially extend or bisect the test specimen axis extending between the specimen holders; and therefore, braces 58, 59 can also include apertures such as similar to aperture 42 in brace 30.

Referring to back to FIG. 1, testing machine 10 has columns 14 that extend through the base 12 to a connecting element 72 that joins ends of the columns 14 on a side of the base 12 remote from the crosshead 16. Likewise, if desired, the columns 14 can extend through the crosshead 16 as indicated in dash lines and be connected with a structural element 70 on ends thereof that are remote from the base 12. In the embodiment of FIG. 1, the base 12 is moveable along the columns 14 and is selectively fixed thereto with clamping devices comprising pneumatic or hydraulic actuators that clamp portions of the base 12 to the outer surface of the columns 14. The base 12 is adjustable so as to vary the distance between the specimen holders 20A, 20B depending upon the length of the test specimen being tested.

FIG. 3 illustrates another form of brace assembly 80 comprising one or more gussets 81, 82, 83, 84 (schematically depicted) connected to the columns 14 at first portions at the locations indicated above such as at or about mid-span between the base 12 and the crosshead 16. The gussets 81-84 can be mounted to the columns 14 using the split collars as found in brace 30. The gussets 81-84 are also securely fixed to the base 12 as illustrated, but could be fixed to the crosshead 16, if desired.

Although the subject matter has been described in language directed to specific environments, structural features and/or methodological acts, it is to be understood that the subject matter defined in the appended claims is not limited to the environments, specific features or acts described above as has been held by the courts. Rather, the environments, specific features and acts described above are disclosed as example forms of implementing the claims.

What is claimed is:

1. A testing machine comprising:
    a column connector;
    a base;
    at least a pair of columns joined to the column connector and extending through the base;
    a crosshead joined to the columns at a location spaced apart from the base;
    at least a pair of specimen holders, wherein a first specimen holder is supported by the crosshead and faces the base, and a second specimen holder is disposed between the first specimen holder and the base;
    an actuator connected to one of the specimen holders; and
    a brace connected to each of the columns and spanning between and structurally joining the columns, the brace being connected to each of the columns at a location along a length thereof between the base and the crosshead.

2. The test machine of claim 1, wherein the brace is connected to each of the columns between ends of the specimen holders remote from each other.

3. The testing machine of claim 1, wherein the brace is connected to each of the columns between ends of the specimen holders closest to each other.

4. The testing machine of claim 1, wherein the brace is connected to each of the columns at a location in a range of about 25% to 75% of a distance between the ends of the specimen holders closest to each other.

5. The testing machine of claim 4, wherein the brace is connected to each of the columns at a location in a range of about 40% to 60% of a distance between the ends of the specimen holders closest to each other.

6. The testing machine of claim 5, wherein the brace is connected to each of the columns at about 50% of a distance between the ends of the specimen holders closest to each other.

7. The testing machine of claim 1, wherein each column includes an axis and the brace includes portions extending along planes between the columns that are parallel to a plane having the axes of both columns.

8. The testing machine of claim 7, wherein the portions at each end of the brace are joined to opposite sides of an outer surface of each respective column along a bisecting plane for each column, the bisecting planes being normal to the plane extending between the columns.

9. The testing machine of claim 1, wherein the brace includes an aperture through which an axis between the specimen holders extends.

10. The testing machine of claim 9, wherein the brace includes a removable portion defining a perimeter portion of the aperture.

11. The testing machine of claim 1, wherein the at least a pair of columns comprises four columns and a second brace connected between two different columns than the brace, the second brace being connected to each of the respective columns at a location along a length thereof between ends of the specimen holders remote from each other.

12. The testing machine of claim 11, and further comprising a third brace and a fourth brace, wherein the brace, the second brace, the third brace and the fourth brace each connect adjacent columns about a perimeter encircling an axis extending between the specimen holders.

13. The testing machine of claim 1, wherein the actuator is disposed in the base.

14. The testing machine of claim 13, wherein the columns extend through base.

15. The testing machine of claim 14, wherein ends of the columns on a side of the base remote from the crosshead are joined together.

16. The testing machine of claim 1, wherein the actuator is disposed in the crosshead.

17. The testing machine of claim 16, wherein the columns extend through the crosshead.

18. The testing machine of claim 17, wherein ends of the columns on a side of the crosshead remote from the base are joined together.

19. A testing machine comprising:
   a column connector;
   a base;
   at least a pair of columns joined to the column connector and extending through the base;
   a crosshead joined to the columns at a location spaced apart from the base;
   at least a pair of specimen holders, wherein a first specimen holder is supported by the crosshead and faces the base, and a second specimen holder is disposed between the first specimen holder and the base;
   an actuator connected to one of the specimen holders; and
   a brace assembly connected to each of the columns at a location along a length of each column between the base and the crosshead, the brace assembly spanning between the columns so as to structurally couple the columns together.

20. The testing machine of claim 19, wherein the brace assembly comprises a brace connected to and spanning between the columns at a location spaced apart from the base and the crosshead.

21. The testing machine of claim 19, wherein the brace assembly comprises a gusset connected to each column, wherein a first end of the gusset is connected to the column and a second end is connected to the base or the crosshead.

* * * * *